(12) United States Patent
Howell et al.

(10) Patent No.: US 8,046,413 B2
(45) Date of Patent: Oct. 25, 2011

(54) AUTOMATIC COMMUTATIVITY DETECTION FOR GENERALIZED PAXOS

(75) Inventors: Jonathan R. Howell, Seattle, WA (US); Jacob R. Lorch, Bellevue, WA (US); John R. Douceur, Bellevue, WA (US); Leslie B. Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1516 days.

(21) Appl. No.: 11/057,591

(22) Filed: Feb. 14, 2005

(65) Prior Publication Data

US 2006/0184627 A1    Aug. 17, 2006

(51) Int. Cl.
G06F 15/16    (2006.01)
(52) U.S. Cl. ........................................................ 709/205
(58) Field of Classification Search .................... 709/205
See application file for complete search history.

(56) References Cited

U.S. PATENT DOCUMENTS

| | | | |
|---|---|---|---|
| 6,463,532 B1 * | 10/2002 | Reuter et al. | 709/224 |
| 7,376,867 B1 * | 5/2008 | Aguilera et al. | 714/21 |
| 2004/0249928 A1 * | 12/2004 | Jacobs et al. | 709/223 |
| 2004/0254984 A1 * | 12/2004 | Dinker | 709/205 |
| 2005/0256824 A1 * | 11/2005 | Vingralek | 707/1 |
| 2007/0226323 A1 * | 9/2007 | Halpern | 709/222 |

OTHER PUBLICATIONS

Dunlap, G.W. et al., "ReVirt: Enabling Intrusion Analysis through Virtual-Machine Logging and Replay", $5^{th}$ *Symposium on Operating Systems Design and Implementation*, Usenix Association, 2002, 211-224.
Garthwaite, A. et al., "Transactions for Java", *Computer and Information Science Department*, University of Pennsylvania, Sep. 9, 1996, 1-9.
Herlihy, M. et al., "Software Transactional Memory for Dynamic-Sized Data Structures", *PODC*, 2003, 8 pages.
Satyanarayanan, M. et al., "Lightweight Recoverable Virtual Memory", *ACM Transactions on Computer Systems Proceedings of the $14^{th}$ ACM Symposium on Operating Systems Principles*, Feb. 1994, 1-15.
Srivastava, A. et al., "ATOM A System for Building Customized Program Analysis Tools", *SIGPLAN*, 1994, 196-205.

* cited by examiner

*Primary Examiner* — John Follansbee
*Assistant Examiner* — Alan Chou
(74) *Attorney, Agent, or Firm* — Woodcock Washburn LLP

(57) ABSTRACT

Synchronized devices comprising a distributed system attempt to agree on a compatible sequence of commands to execute. Each device in the distributed system may act as a proposer, acceptor, or a learner. Each proposer proposes a command for each device to execute. The acceptors either accept or reject the proposed commands. The learners keep track of the proposed commands and determine, using a transactional substrate, whether the acceptors have a accepted sequences of commands that commute with respect to one another. Once the learners have determined that a quorum of acceptors have accepted sequences of commands that commute with respect to one another the accepted commands are executed by each device in the distributed system.

14 Claims, 5 Drawing Sheets

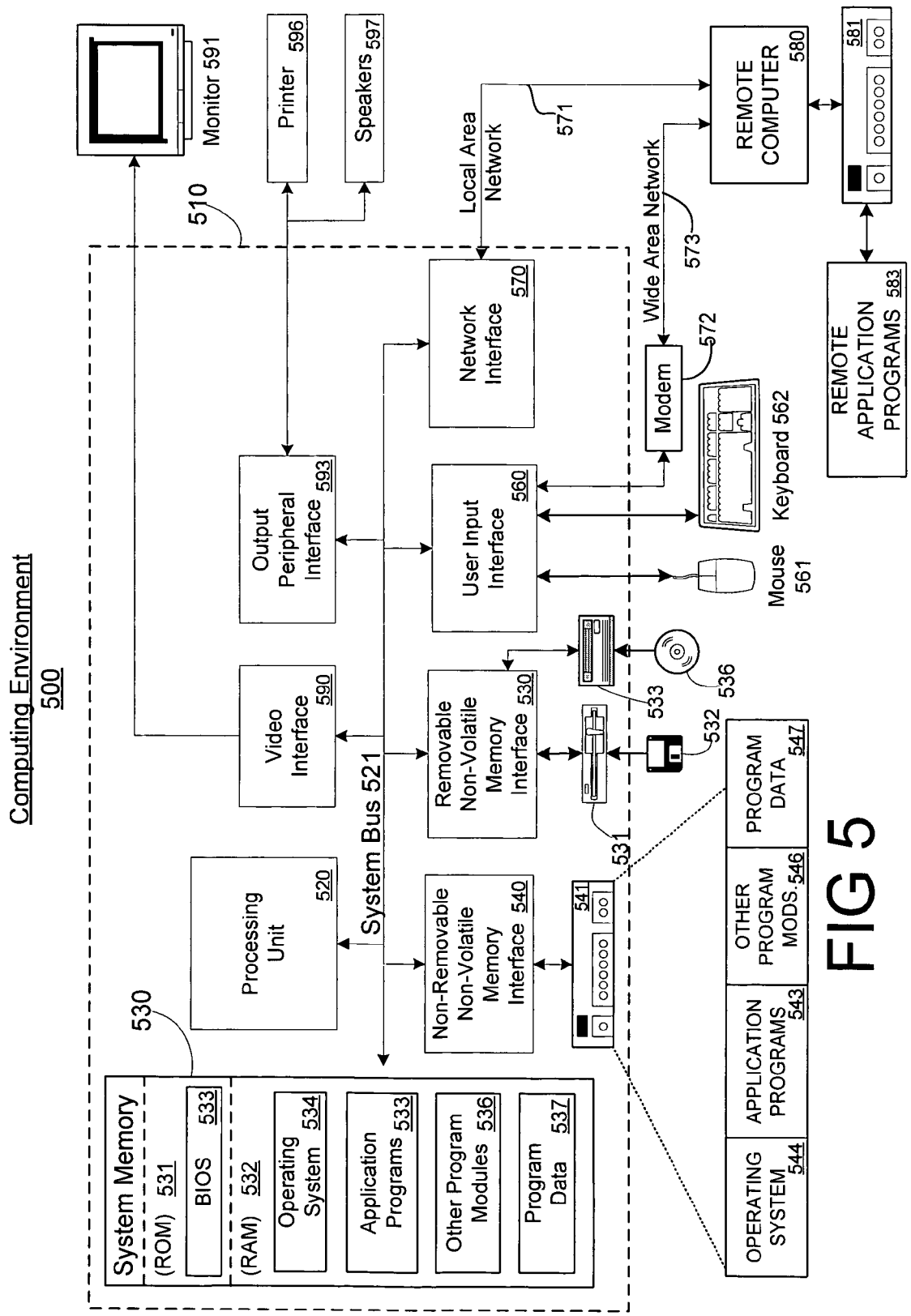

AUTOMATIC COMMUTATIVITY DETECTION FOR GENERALIZED PAXOS

CROSS REFERENCE TO RELATED APPLICATIONS

This Application is related to U.S. patent application Ser. No. 10/996,351 "Generalized Paxos", the contents of which are hereby incorporated by reference.

FIELD OF THE INVENTION

This invention relates generally to distributed computing and, more particularly, relates to the automatic detection of commands that commute for use in the generalized Paxos algorithm.

BACKGROUND OF THE INVENTION

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to provide more reliable access to data and computational resources. An advantage of distributed systems is the ability to continue to operate in the face of physical difficulties that would cripple a single, larger computing device. Such difficulties could include sustained power outages, inclement weather, flooding, and terrorist activity, for example.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because timekeeping across individual processes can be difficult at best, a state machine approach can be used to coordinate activity among the individual devices. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute identical commands in identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a higher proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

However, if two or more actions or requests need not be ordered with respect to one another, then the Paxos algorithm can be made more efficient by allowing a more generalized agreement among the constituent devices. Often two requests that are transmitted at approximately the same time commute with one another. More specifically, the response to one request sent at approximately the same time as another request is not affected by the other request. For example, in a banking system customer A can issue a request to deposit $100 into her account at approximately the same time that customer B issues a request to withdraw $50 from his account. These two exemplary commands commute because customer B's request to withdraw $50 from his account does not change customer A's balance irrespective of whether customer B's request is performed before or after customer A's request. Consequently, a device that executes customer B's request first will provide the same results to both customer A and customer B as a device that executes customer A's request first, and both devices will agree about the resulting system state, so that future commands also generate consistent responses.

The generalized Paxos algorithm recognizes that devices selecting commuting commands in any order remain synchronized. For example, the generalized Paxos algorithm can recognize that a device selecting customer A's request prior to customer B's request is in agreement with a device selecting customer B's request prior to customer A's request. Consequently, a generalized Paxos algorithm can seek to achieve agreement on a series of functions, executed as a series of steps, while the above-mentioned Paxos algorithm required agreement on a step-by-step basis.

However, while the generalized Paxos algorithm is more efficient than the Paxos algorithm because it achieves agreement on series of steps, rather than on a step-by-step basis, the generalized Paxos algorithm still must be able to recognize which functions or steps commute before it can achieve agreement on a particular series. Absent the present invention, programmers implementing the generalized Paxos algorithm would have to explicitly declare beforehand the commutativity for each function or step. This greatly complicates the programming of distributed systems, and can create errors that may be difficult to detect during testing. In addition, the programmers may not fully recognize all of the functions that commute, thus reducing the effectiveness of the generalized Paxos algorithm. Furthermore, it is possible that functions commute only when the state they are applied to possesses a certain property, and the programmer, not being able to rely on this property always holding, must conservatively dictate that the functions do not commute.

Therefore what are needed are systems and methods for automatically detecting commutativity of functions for use in the generalized Paxos algorithm.

SUMMARY OF THE INVENTION

Each device in a distributed system may act as a proposer, acceptor, and a learner. Each proposer proposes a command for each device to execute. The acceptors either accept or reject the proposed commands. The learners keep track of the proposed commands and determine, using a transactional substrate, whether the acceptors have accepted sequences of commands that commute with respect to one another. Once the learners have determined that a quorum of acceptors have accepted sequences of commands that commute with respect to one another the accepted commands are executed by each device in the distributed system.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is a block diagram showing an exemplary computing environment in which aspects of the invention may be implemented.

DETAILED DESCRIPTION OF ILLUSTRATIVE EMBODIMENTS

Figure 1:
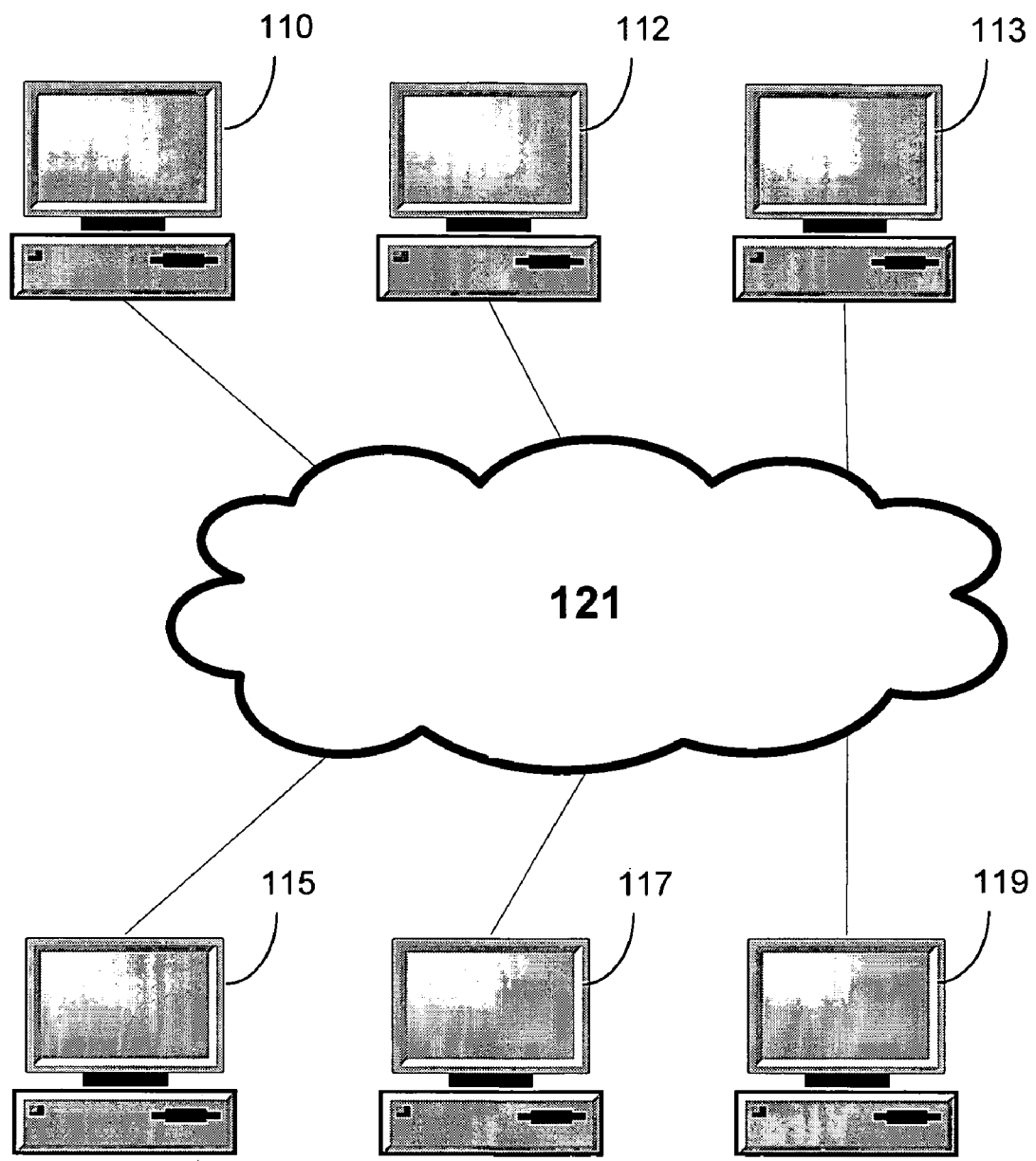
FIG. 1 is a diagram of an exemplary distributed system in accordance with the present invention.

FIG. 1 is a diagram of an exemplary distributed system in accordance with the present invention. The distributed computing system may comprise a number of computing devices, shown on FIG. 1 as computing devices 110, 112, 113, 115, 117, and 119. The computing devices are able to communicate with one another, or other devices (not shown), through the network 121. Network 121 may be a local area network, or a wide area network, such as the internet for example. The distributed computing system can aggregate the abilities of its constituent computing devices to implement redundancy allowing computing devices 110, 112, 113, 115, 117, and 119 to provide access to the same information. For example, a web server operating a popular website may be distributed across the computing devices. A request to access the website may be received and granted by any of the computing devices shown. Such a configuration creates redundancy because if any particular computing device should fail there are other computing devices to take its place, for example.

Such a distributed computing system can be thought of as a state machine, with the future state of the machine defined by the current state and the action to be taken. Each constituent device of the distributed computing system can then independently execute the state machine of the overall system. The state machine approach can be implemented asynchronously; so that precise synchrony across the constituent devices need not be maintained and synchronization between the devices can be achieved by setting an initial state for all of the devices and subsequently executing the same functions in the same order, for example. A common method for maintaining synchronization is to allow the constituent devices of the distributed computing system to all agree upon the next function before executing that function, and to maintain a list of the functions that were executed. In such a manner, every device can be assured to have the same state.

Often two or more functions may commute with one another. As used herein, the term "commute" refers to pairs of functions or commands where the result of one function does not change, regardless of whether the other function has already been executed or not. Similarly, a set of functions can "commute" if every pair of functions in the set commutes. As an example of a pair of functions that do not commute, in a database system, a request to read a record does not commute with a request to edit that record because the value that is read can be different depending on whether the request to read the record was granted before or after the request to edit the record. However, as an example of a pair of functions that do commute, a request to edit one record commutes with a request to edit an unrelated record, since the result of editing one record does not change whether or not another, unrelated, record was edited before or after.

The state of each device in a distributed computing system can remain synchronized, and each device can provide the correct response to requests if, for any pair of requests that do not commute, the requests of that pair are responded to by each device in the same order. For any pair of requests that do commute, those requests do not need to be responded to by each device in the same order, since, by definition, their ordering does not change the result of the requests. Returning to the above example, to maintain consistency, each of the devices of a distributed computing system can either select to respond to the request to read a record before responding to the request to edit that record, or each of the devices can select to respond to the request to edit the record prior to responding to the request to read that record. However, consistency would still be maintained if some devices selected to respond to the request to edit an unrelated record before responding to the edit request directed to the first record, while other devices responded to those requests in the opposite order.

While sequences of functions performed in response to various requests can be considered equivalent so long as the order of pairs of non-commuting functions is maintained, the sequences are not equal. Thus, while a sequence of functions editing two unrelated records in one order is equivalent to a sequence of functions editing the two unrelated records in the opposite order, the two sequences are unequal. Therefore, to express the commutivity of sequences of functions the concept of a "command structure", or "C-Struct", can be used. A command structure can be similar to a sequence of functions, with the exception that two or more command structures can be equal even if they comprise difference sequences of functions. Specifically, two or more command structures are considered equal if each of the command structures has the same number of commands, every command that appears in one C-Struct appears in the other, and for every pair of commands in one C-Struct that do not commute, those commands appear in the same order in the other C-Struct.

The generalized Paxos algorithm can, therefore, rather than agreeing on a particular function for every step, simply agree on ever-increasing equivalent command structures. By virtue of agreeing on command structures, a generalized consensus algorithm can accommodate a variety of orderings of pairs of commands that commute, and need not create inefficiencies by forcing each device to select the same command for each system step. The generalized Paxos algorithm can similarly provide that once a command structure is selected, it is a prefix of future selected command structures and can also provide that the command structures selected by any two devices are compatible.

In the generalized Paxos algorithm, each of the computing devices 110, 112, 113, 115, 117, and 119 can act as one of a proposer, an acceptor, or a learner. In addition, each device may perform all of the roles simultaneously.

At some point in time a client device (not shown) may request that the distributed system execute a command 'd'. Later, that same client device or other client device may propose that the distributed system execute a command 'e'. Assume that the proposed commands commute with respect to one another. Because of network delay, computing devices 110, 112, 113, 115, 117, and 119, may receive the requests for execution out of order, or not at all. For example, devices 110-113 may have received the request to execute command e first and command d second. Devices 115-119 may have received the request to execute command d first and command e second. Accordingly, at least one proposer executing at devices 110-113 proposes the execution of command e, followed by a proposal for the execution of command d. Similarly, at least one proposer executing at devices 115-119 proposes the execution of command d, followed by a proposal for the execution of command e.

Acceptors executing at devices 110-119 receive the proposed commands. The acceptors either accept, or vote for, the received proposal, or reject, or vote against, the received proposal. The acceptors vote for any proposal associated with a ballot that is greater than or equal to the highest ballot number previously received. Similarly, the acceptors vote against a proposal associated with a ballot that is less than highest ballot number received. Assuming that the current ballots are the highest ballots yet received by any of the acceptors, each of the acceptors executing at the computing devices desirably accepts the proposed commands received. Assume also that acceptors at computing devices 110-113 accept votes for command e followed by command d, and acceptors at computing devices 115-119 accept votes for command d followed by command e, for example.

When the acceptors accept a proposal, they desirably notify learners that they have accepted a proposal and what command that proposal is for. The learners, using the votes received from the acceptors, determine if the voted-for commands commute with commands previously voted for by the acceptors, and if a quorum of acceptors has voted for a compatible sequence of commands. For example, assume a learner receives votes from computing devices 110, 113, 115, 117, and 119. The learner desirably records that devices 115, 117, 119 have voted for the sequence d, e, while computing devices 110 and 113 have voted for the sequence e, d.

In order to determine if the sequences are compatible, or commute, the learner desirably executes commands e and d in a transactional substrate associated with a state machine corresponding to each of the computing devices. The transactional substrate is such that the commands can be executed to determine objects read from and written to, as well as any generated client responses, without committing the state machines to the resulting client responses or object writes. This set of objects and generated client responses are known as the transactional state. The transactional state is desirably saved for later use, as described with respect to FIG. 3, for example.

The objects or memory addresses accessed during execution in the transactional substrate are used to determine whether the commands e and d commute with respect to one another, for example. If e and d do not alternatively read or write from the same object then they commute. Assume that the learner determines that e and d commute.

After determining if newly received commands commute, the learner desirably determines if a quorum of acceptors has voted for a compatible sequence of commands or C-Struct. As described previously, the learner has received votes from devices 110, 113, 115, 117, and 119. Because the devices have voted for C-Structs that comprise e and d, the learner desirably determines that the C-Structs are compatible.

Because a quorum of devices (five out of the six) have now voted for compatible sequences of commands, the learner can instruct the devices to commit to the commands in the voted-for C-Structs. The learner may also send messages to other learners in the system to tell them that a quorum of acceptors has chosen a compatible sequence of commands, for example. The learner is described in further detail with respect to FIGS. 2 and 3, for example.

Figure 2:
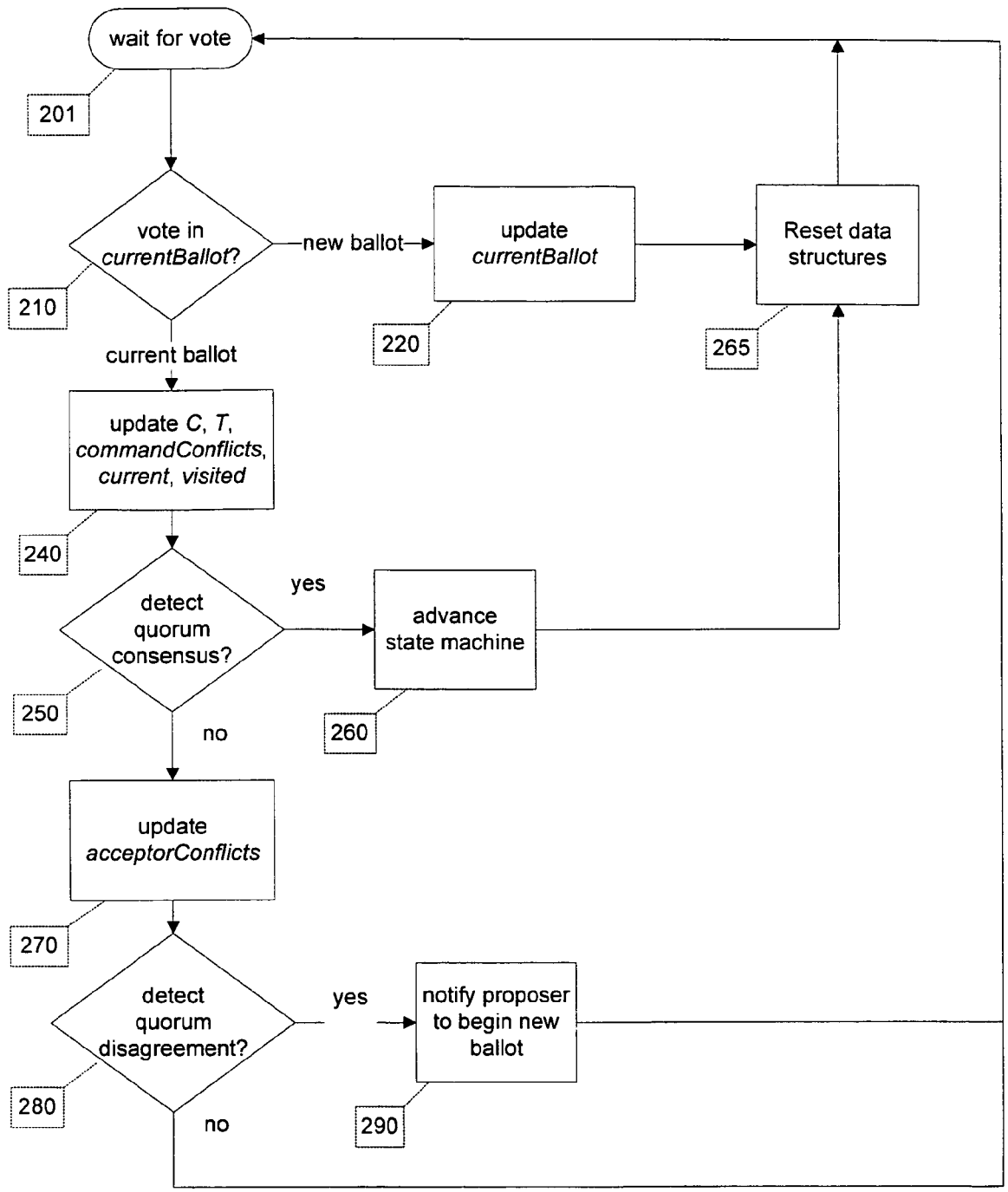
FIG. 2 is a flow diagram illustrating the generalized Paxos algorithm utilizing an exemplary method for commutativity detection in accordance with the present invention.

FIG. 2 is a flow diagram illustrating an exemplary learner in a generalized Paxos algorithm utilizing an exemplary method for commutativity detection in accordance with the present invention. As described previously, the generalized Paxos algorithm comprises several devices, with each device capable of performing as acceptors, learners, or proposers. Any given device may perform one or more roles simultaneously. The method may be implemented as part of a distributed computing system as described with respect to FIG. 1, for example.

Proposers propose a command for the devices to execute. The proposal may be associated with a current ballot, or the proposal may be associated with a new ballot. Each ballot desirably corresponds to a set of commands for the devices to execute. The proposal comprises a unique ballot number and the proposed command. Any system, method, or technique known in the art for generating a proposal may be used. Acceptors either vote for or against the proposed command from the proposer. The acceptors vote against proposals with a ballot number less than the highest previously accepted ballot. Similarly, an acceptor votes for a proposal with a ballot number greater than or equal to the highest previously received ballot number. Learners desirably determine if a quorum of acceptors have accepted votes for a common sequence of commands or C-Struct.

A command is defined to commute with another command if the result of executing the two commands is independent of the order that the commands are executed. In order to determine if commands commute with one another, the learner is desirably able to pre-execute each command at a transactional substrate associated with the state machine and determine if any two commands commute based on the results of the pre-execution. Learners also desirably detect if the acceptors have voted in such a way that no quorum is possible, and if so, the learner desirably prompts a leader to resolve the disagreement by starting a new ballot.

In order to facilitate quorum and commutivity detection, tables and variables are desirably maintained at, or are accessible by, each learner operating in the distributed system. These tables and variables include the current ballot (currentBallot), a set of commands that acceptors have voted for (C), a table of outstanding transactions (T), a table of command conflicts (commandConflicts), a table comprising an entry for each acceptor in the distributed system and the compatible prefix of commands that the acceptor has accepted votes for (current), a table mapping C-Structs to the acceptors accepting those C-Structs (visited), and a table comprising an entry for each acceptor and an indicator of whether or not they have accepted a C-Struct containing commands that do not commute with commands accepted by another acceptor (acceptorConflicts).

CurrentBallot comprises a variable set to the highest numbered ballot that a particular learner has received a vote for from an acceptor. When a learner receives a ballot with a number greater than the current ballot, the learner desirably sets currentBallot to the newly received ballot number.

C comprises a table or other data structure comprising identifiers corresponding to each command that the acceptors have accepted votes for. As described previously, the distributed system may comprise several learners, each of which may have received different votes from different acceptors; accordingly, this set may differ from learner to learner.

The table T comprises the results of the pre-execution of each command in the transactional substrate. The table T comprises an entry for each of the commands that the acceptors have voted for, and the transactional state that results from the pre-execution of that command. The transactional state comprises a record of the objects read during the pre-execution of the command, a record of the objects written and the corresponding written values, and a record of any response sent to the client generating the command, for example. In order to determine if a particular set of commands received by the learner commutes with respect to the state machine associated with that learner, the learner desirably pre-executes each command in the transactional substrate to determine the resulting transactional state. The commands are executed without actually committing the state machine to the resulting values. However, if at a later time, the learner is able to detect a quorum for a particular prefix or subset of C, it is desirable that the learner be able to commit the state machine to the transactional states associated with the commands without re-executing each command. Accordingly, as each command in C is tested by pre-executing the command in the transactional substrate, the resulting transactional state is desirably saved in the table T. Saving the transactional states in T allows the state machine to commit to the execution of each command without re-executing each command in the set. Any system, method, or technique known in the art for storing the results of an executed command can be used.

The table commandConflicts comprises an entry for each pair of commands in the set of commands C that conflicts. For example, as described above, each command is desirably pre-executed in the transactional substrate to determine, among other things, the objects read from or written to. These results are saved in the outstanding transaction table T, for example. The commandConflicts table is desirably incrementally populated by searching the transactional states in table T and making an entry in the commandConflicts table for every pair of commands that has a potential conflict. For example, if one command reads from an object that another command writes to, there is the potential for a conflict because the result of the execution of one command may be dependent on the execution of the other. Accordingly, these commands can be said to conflict. Any system, method, or technique known in the art for detecting a conflict can be used.

The table current comprises an entry for each acceptor in the distributed system and the compatible prefix of commands that the acceptor has accepted votes for. After the learner determines that a command voted for by an acceptor commutes with respect to the commands in C the learner appends the voted-for command to the C-Struct associated with the acceptor in current. If the voted-for command does not commute with respect to the C-Struct associated with the acceptor in current then a sentinel value, such as 'done' for example, is desirably appended to the C-Struct in current. The non-commuting command, and any further commands voted for by the acceptor are set aside in a buffer, for example. After the learner detects a quorum on a particular C-Struct, the commands in the buffer associated with the acceptor, and any commands in current that were not part of the C-Struct accepted by the quorum, are desirably re-evaluated for commutativity as if they had just been voted for by the acceptor.

The table visited comprises a table with an index corresponding to each of the sets of commands, or C-Structs, along with the number of acceptors that have voted for that C-Struct, for example. The table visited can be used by the learner to determine if there is a quorum among the acceptors. If any C-Struct in visited has an associated number of acceptors greater than or equal to the number of acceptors required for a quorum, then the learner can desirably commit the associated C-Struct to the state machine because there is a quorum of acceptors that have accepted that C-Struct. Any, system, method, or technique known in the art may be used to determine acceptable quorum configurations.

The table acceptorConflicts comprises a mapping of pairs of acceptors to a Boolean value indicating whether the acceptors have accepted conflicting sequences of commands. When a learner has not detected a quorum, the learner references this table to detect whether a quorum's formation is thereafter impossible, for example. By examining acceptorConflicts, the learner can desirably determine if, given the current C-Structs accepted by the various acceptors, there exists the possibility of reaching a quorum among the acceptors.

For example, the learner may evaluate the compatibility of all possible quorums of acceptors chosen from the participating acceptors. The compatibility of each possible pair of acceptors in each quorum can be determined by looking up each pair in the acceptorConflicts table, for example. If a possible quorum is found that contains all compatible acceptors, then the possibility of a quorum still remains.

The learner may further improve the efficiency of conflict detection by first generating the possible acceptor quorum combinations in some fixed order, for example. The learner may then consider the combinations in turn starting from the beginning of the order. Once a compatible combination is detected, the learner desirably records the compatible combination for use later. Because a non-compatible combination will never later become compatible, the next time the learner evaluates the possibility of a quorum it desirably starts considering at the combination where it previously left off.

At 201, the learner waits to receive a vote from one of the plurality of acceptors. As described previously, a plurality of learners may be executing at one or more devices in a distributed system as shown in FIG. 1, for example. Each device may be associated with a state machine. 201 can be described as the quiescent state where the learner idles between votes from the acceptors.

At 210, a new vote has been received by the learner from an acceptor. Associated with the vote is a ballot number. The ballot number of the received vote is compared with the current ballot number associated with the learner. As described previously, the current ballot number may be stored in a variable called currentBallot, for example. If the newly received ballot number is greater than currentBallot, then the newly received ballot is a new ballot and the learner desirably continues to step 220. Else the learner continues to step 240.

At 220, it has been determined that the newly received vote has a higher ballot number than the current ballot. Accordingly, the learner sets currentBallot to the newly received ballot. The learner may continue at 265 where the data structures associated with the current ballot are desirably reset.

At 240, the learner has determined that the newly received vote is part of the current ballot. Accordingly, the learner may determine if the command associated with the newly received vote commutes, or is otherwise compatible with, the previous commands, or C-Structs, previously voted for by the acceptor. The learner also may determine if the newly received command conflicts with any of the previously proposed commands by any other acceptors, if any. In addition, the learner may update the tables C, T, commandConflicts, current, and visited to reflect the newly received command. This step is described with greater detail at FIG. 3.

At 250, the learner determines if a quorum of acceptors have come to a consensus on a compatible set of commands or C-Struct. A set of commands is compatible with another set of commands if each command in the sets commutes with respect to one another, or any commands that do not commute appear in the same sequential order in both sets, for example. The learner determines if a quorum has been achieved by searching the table visited looking for any set of commands accepted by a set of acceptors comprising an acceptable quorum configuration. Any, system, method, or technique known in the art may be used to determine acceptable quorum configurations.

As described previously, the table visited is updated to reflect the newly received command. Alternatively, because the current set of commands associated with the current ballot is known from step 240, a quorum can be detected by noting the set of acceptors associated with the C-Struct corresponding to the current ballot in visited. If a quorum is detected the learner desirably moves to 260. Else, the learner desirably continues at 270.

At 260, the C-Struct, or sequence of commands, currently associated with the quorum is committed into the state of the state machine. As described further with respect to FIG. 3, each received command in C was desirably evaluated in the context of a transactional substrate associated with the state machine. Executing the command in the context of the transactional substrate allows the learner to determine a transactional state associated with the execution of the command, without committing the state machine to the transactional state. However, to avoid re-executing each command, the transactional state was desirably saved in table T. This allows the state machine to commit to the transactional state without re-executing the command. Accordingly, the learner desirably instructs the state machine to commit each of the recorded transactional states in T corresponding to the commands in the C-Struct associated with the quorum. Because all of the commands in the C-Struct have been determined to commute, there is no particular order in which the agreed upon commands should be committed to the state machine. After committing the relevant transaction in T to the state machine, the commands in T may be discarded. Alternatively, the commands in T not committed to the state machine, may be retained because it is likely that the commands may be proposed in forthcoming ballots. Those commands that were set aside, or placed in a buffer, due to conflict with the just-committed command structure may be re-executed to repopulate T. After committing the transactional states to the state machine, the learner desirably continues to 265 where the rest of the data structures are reset.

At 265, the data structures associated with the current ballot may be reset. However, not all of the data structures are simply cleared. For example, if the learner is resetting the data structures because a new ballot has been received, much of T is desirably preserved because many of the commands in the new ballot are likely to be duplicates of some of the commands already in T. If the data structures are being reset because a quorum has been detected for a particular C-Struct, then those commands comprising the C-Struct should be discarded while the commands not part of the C-Struct should be preserved. In addition, commandConflcits should be updated to reflect the remaining commands in T and their commutativity with respect to one another. The remaining tables, current, visited, and acceptorConflicts are all desirably cleared. After resetting the data structures the learner may return to step 201 to wait for a new vote.

At 270, it has been determined that there has not yet been a quorum of acceptors for this ballot. Because no quorum has been reached the learner updates the acceptorConflicts table to indicate if there is a conflict among the acceptors for this ballot. As described previously, the acceptorConflicts table comprises a mapping of pairs of acceptors to a Boolean indicator of whether the acceptors have accepted conflicting sequences of commands, for example. To update the table, the learner desirably considers in turn, each acceptor '$a_2$' other than the current acceptor 'a' that sent the most recent vote, for which the entry in acceptorConflicts for a and $a_2$ does not indicate that a conflict has already been detected. If any command associated with $a_2$ in the table current is found to conflict with the current command, then the entry in acceptorConflicts for a and $a_2$ is marked to indicate a conflict between a and $a_2$. Conflicts between the commands associated with $a_2$ in the table current may be determined by searching the table commandConflicts looking for matches between the current command and the commands associated with $a_2$, for example.

At 280, the learner determines if there is a quorum disagreement. A quorum disagreement indicates that there is no longer the possibility of the distributed system agreeing on a compatible sequence of commands. If the learner determines that the possibility of quorum exists then the learner desirably returns to 201 to wait for a new vote. Else the learner should resolve the conflict at 290 by notifying a proposer to begin a new ballot.

At 290, the learner has determined that a quorum among the acceptors is no longer possible. Accordingly, to resolve the conflict the learner must notify a proposer to begin a new ballot. The proposer desirably proposes a new ballot with a higher ballot number than any previous ballots. Accordingly, when the proposer proposes a vote with the new ballot number, each acceptor will desirably accept the new ballot as it is by definition the highest received ballot number. Similarly, each learner will desirably reset the data structures associated with the previous ballot at 265.

Figure 3:
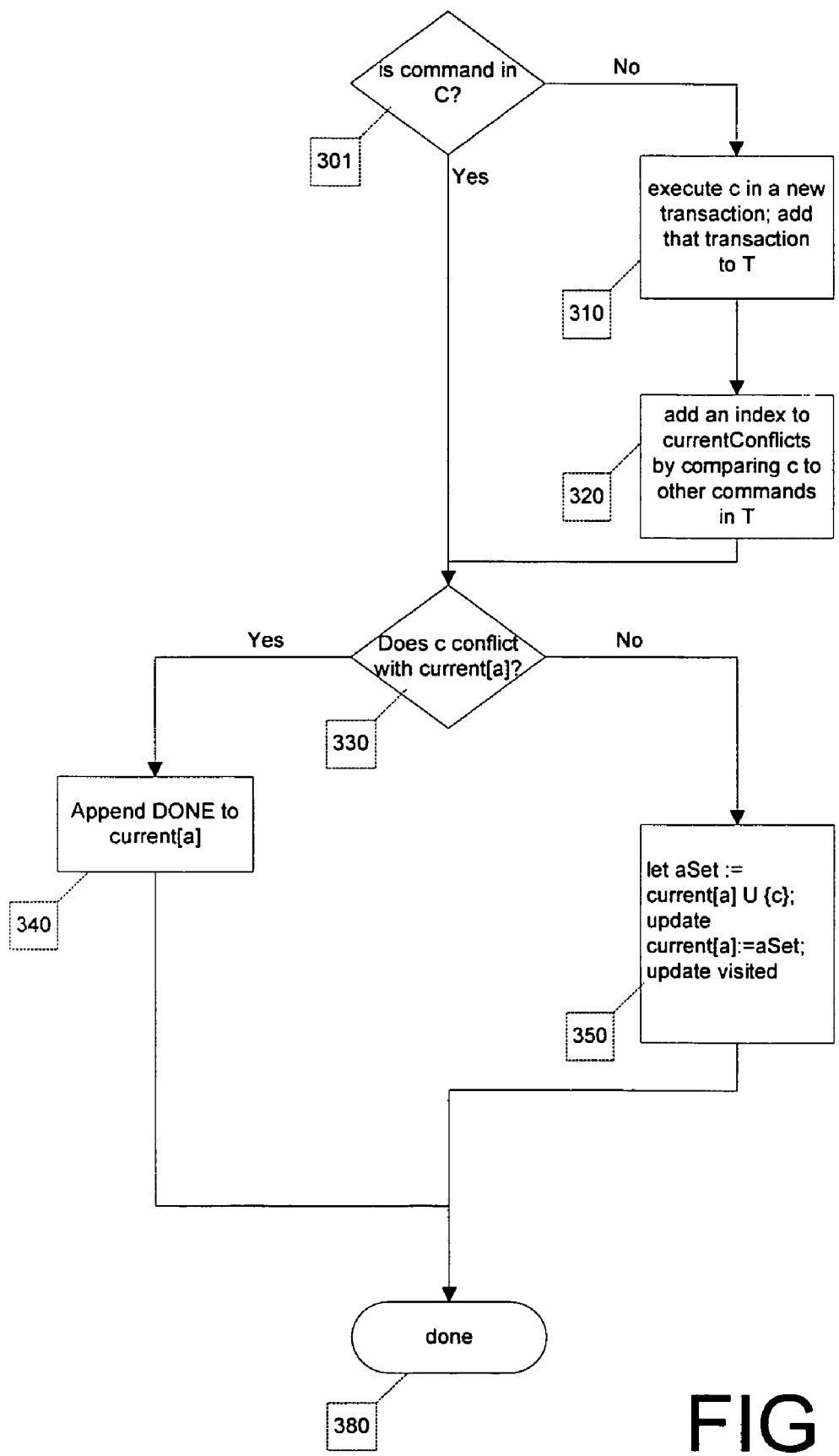
FIG. 3 is a flow diagram illustrating an exemplary method for commutativity detection in accordance with the present invention.

FIG. 3 is a flow diagram illustrating an exemplary method for commutativity detection in accordance with the present invention. As described in FIG. 2, a vote for a command has been received by the learner from an acceptor. Before the command can be added to the current set of commands, or C-Struct, associated with the acceptor, it is desirably determined if the newly received command conflicts with any of the commands already voted for by the acceptor. If the command is determined to commute with the other commands in the C-Struct, then the command is desirably added to the C-Struct associated with the acceptor. If the command is found not to commute, then a sentinel value such as 'done' may be appended to the C-Struct associated with the acceptor and the command is added to a buffer for consideration after the learner commits to a particular C-Struct. Marking the C-Struct as done avoids further evaluating the commutativity of future commands with respect to the commands in the C-Struct when it is likely that the commands in the C-Struct will be committed before the future commands are committed, for example.

At 301, it is determined if the newly received vote is for a command not already in the set of commands C that have already been voted on by the acceptors in the current ballot. If the command is found in C then it was already determined if the command commutes with the commands in C, and there is no reason to reevaluate the command. If the command corresponding to the newly received vote is not found in the set C, then the learner desirably continues at 310. Else the learner proceeds to 330.

At 310, the command corresponding to the newly received vote is added to C. In addition, a transaction is executed corresponding to the newly received command. As described previously, the command is desirably executed in a transactional substrate associated with the state machine. The transactional substrate allows the resulting transactional state associated with the command to be determined, without committing the state machine to the resulting transactional state. Once the transaction is completed, the resulting transactional state is placed in the transactions table T along with the command. The table T desirably holds the transactional states associated with the commands in C so that once it is determined that a quorum of acceptors have voted for a compatible set of commands, or C-Struct, the transactional state associated with the commands can be committed without having to re-execute each command.

At 320, the transactional state associated with the newly proposed command is compared with the transactional states of existing commands in C to determine if there are any conflicts. As described previously, the transactional state, among other things, comprises the objects written to, and read from during the execution of a particular command in the transactional substrate. A first command is said to conflict with a second command if executing the first command results in a read from an object or memory address that the execution of the second command results in a write to, or vice-versa. The commutativity of the command with each of the commands in C is desirably determined by looking at each transactional state associated with the commands in C, and looking for overlapping objects or memory addresses. The results are desirably stored in the table commandConflicts, comprising an index for each command in C and an indication of whether that command conflicts with any of the other commands. By storing known conflicts for each command, the system may avoid reevaluating a given transaction when it is already known if that transaction conflicts with any of the commands in C.

At 330, it is determined if the current command conflicts with any of the previous commands voted on by the acceptor associated with the current command. Command conflicts are desirably detected by searching the table commandConflicts for each command in the table current of commands previously voted on by the current acceptor. If a conflict is detected the learner continues at 340. Else, there is no conflict and the learner continues at 350.

At 340, the learner has determined that there is a conflict between the command associated with the current vote, and one or more of the commands voted for by the current acceptor. In order to record the conflict a sentinel value is desirably recorded in the table current for the current acceptor, for example the value 'done'. As described previously the table current desirably comprises an entry for each acceptor in the distributed system and the compatible prefix of commands that that acceptor has accepted votes for. The value 'done' is desirably appended to the C-Struct associated with the current acceptor to indicate that a conflicting command has been voted for by this acceptor and that no further votes from this acceptor will be accepted. In addition, the command may be added to a buffer associated with the acceptor, for example. Later, after a quorum of acceptors agrees upon a compatible sequence of commands and the entries for those commands are cleared from T, the commutativity of the commands from the buffer can be reconsidered by the learner with respect to the previously voted-for commands that were not part of the C-Struct chosen by the quorum. After updating current, the learner exits at step 380.

At 350, the learner has determined that there is no conflict between the command associated with the current vote and any of the previously voted-for commands by the current acceptor. Accordingly, a new variable, 'aSet' is desirably created comprising the union of the set of previously voted-for commands by the current acceptor and the command associated with the current vote. The entry in current corresponding to the current acceptor is desirably set equal to aSet. In addition, the table visited is desirably updated to reflect that the current acceptor can be added to the set of acceptors that have now voted for the set of commands comprising aSet.

At 380, the learner has determined the commutativity of the current command and updated the corresponding tables. The learner may now calculate if a quorum of acceptors have now agreed upon a compatible C-Struct. This step is described further at 250, for example, as shown with respect to FIG. 2.

Figure 4:
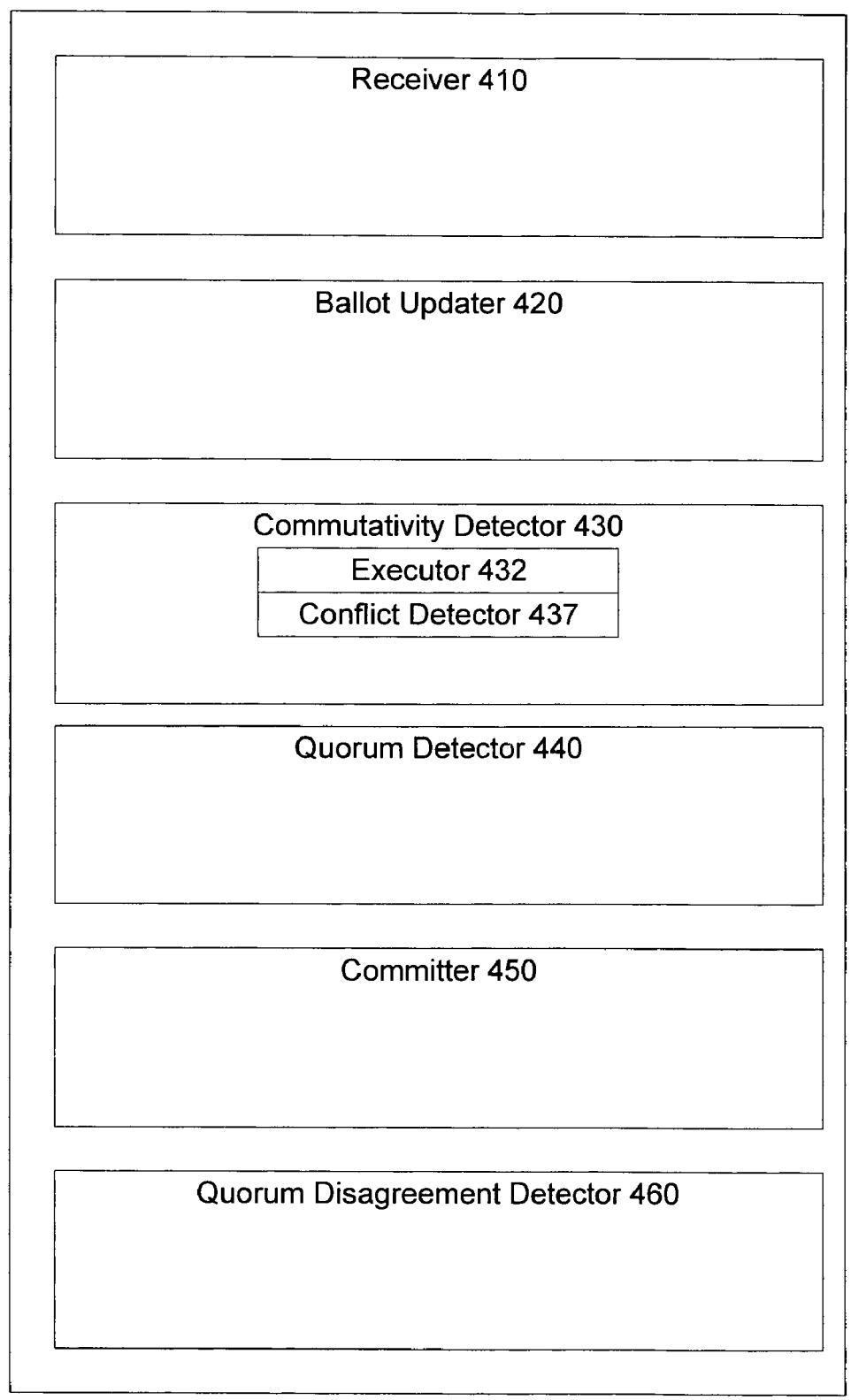
FIG. 4 is a block diagram illustrating components of an exemplary commutativity detection system in accordance with the present invention.

FIG. 4 is block diagram of an exemplary system for commutativity detection in the generalized Paxos algorithm in accordance with the present invention. The generalized Paxos system includes several means for performing functions. These means include a receiver 410, a ballot updater 420, a commutativity detector 430, a quorum detector 440, a committer 450, and a quorum disagreement detector 460.

The receiver 410 receives a vote from one of a plurality of acceptors. As described with respect to FIG. 1, the generalized Paxos algorithm is used to ensure that a plurality of devices in a distributed system maintain the same state with respect to one another. In order to facilitate this, the devices are divided into proposers, learners, and acceptors. Each device in the distributed system is desirably capable of behaving as all three devices. A proposer desirably proposes a sequence of commands for the devices to execute by sending a series of votes to acceptors with desirably one proposed command per vote. This sequence of votes is known as a ballot. Each acceptor desirably votes for a command that has a ballot number equal to or greater than the highest ballot number received. A learner desirably learns which commands one or more of the acceptors have voted for. The learner desirably determines if the most recent command voted for by an acceptor commutes with previous commands voted for by the acceptor. In addition, the learner compares sequences of commands voted for by the acceptors, and desirably determines if a quorum of acceptors has voted for a compatible prefix of commands, or C-Struct. Once the learner detects that a quorum of acceptors has voted for a compatible sequence of commands, the C-Struct can be committed to the associated device. As each learner in the system detects the quorum, the C-Struct is desirably committed to each of the learners in the distributed system. The receiver 410 can be any implemented using any suitable system, method or technique known in the art for receiving a vote from an acceptor. The receiver 410 can be implemented using software, hardware, or a combination of both.

The ballot updater 420 determines if a received vote is associated with a ballot number greater than the largest previously received ballot. The ballot updater 420 desirably compares the ballot number of the received vote with a stored variable corresponding to the current ballot, and replaces the current ballot with the newly received ballot number if it is determined that the ballot number is greater than the largest previously received ballot. In addition, because receiving a ballot number greater than the previously received ballot number indicates a new set of proposed commands or C-Struct for the distributed system, tables or data structures associated with the proposed commands are desirably reset. These tables and data structures are described further with respect to FIGS. 2 and 3. The ballot updater 420 can be any implemented using any suitable system, method or technique known in the art for determining if a new ballot is more current than a previous ballot. The ballot updater 420 can be implemented using software, hardware, or a combination of both.

The commutativity detector 430 determines if a command voted for by an acceptor commutes, or is otherwise compatible, with the set commands previously voted for by the acceptor. The commutativity detector desirably further comprises an executor 432, and a conflict detector 437.

The executor 432 comprises a transactional substrate for executing the received command, such that the command can be executed in a state machine environment corresponding to the devices comprising the distributed system without committing the state machine to the calculated result or transactional state. As described with respect to FIG. 3, the transactional state is desirably saved in the transaction table T, for example, such that if a quorum is later detected the state machine can be committed to the associated transactional states without re-executing the commands. The executor 432 can be implemented using software, hardware, or a combination of both.

The conflict detector 437 determines if there is a potential conflict between any of the commands in the set of commands voted for by the acceptors. As described previously with respect to FIG. 3, a conflict may exist between two commands if those two commands either write from and read to, or read from and write to, the same object or memory location, for example. The conflict detector 437 detects a conflict between any two commands that either write from and read to, or read from and write to, the same object or memory location. The conflict detector 437 can be implemented using software, hardware, or a combination of both.

The quorum detector 440 determines if a quorum of acceptors have voted for a compatible sequence of commands. The quorum detector desirably determines if a quorum of acceptors have voted for a compatible sequence of commands by comparing the sequences of commands voted for by each of the acceptors. If a compatible sequence of commands has been voted for by an acceptable quorum configuration of acceptors, then the sequence of commands can be committed to each of the devices in the distributed system. The quorum detector 440 can be implemented using software, hardware, or a combination of both.

The committer 450 commits the sequence of commands associated with the detected quorum to the devices in the distributed system. The committer desirably retrieves the previously determined transactional state associated with each command from the transaction table T, for example. The committer 450 desirably commits each device to the retrieved transactional states. The order that the committer 450 commits each device to the retrieved transactional states is not important because each of the commands in the set have already been determined to commute and are therefore not dependent on the order of execution. The committer 450 can be implemented using software, hardware, or a combination of both.

The quorum disagreement detector 460 determines if a quorum of acceptors agreeing on a set of commands is possible. As described further with respect to FIG. 2, after determining that no quorum is detected the learner desirably determines if the possibility remains for a future quorum based on the sets of commands that the acceptors have voted on. The quorum disagreement detector 460, for each acceptor, desirably determines if that acceptor has voted for a set of commands that conflicts with a set of commands from any other participating acceptor. If the number of participating acceptors that have voted for conflicting sets of commands is such that a quorum of acceptors voting for compatible sets of commands is no longer possible, then the quorum disagreement detector 460 desirably notifies a proposer to begin a new ballot. The quorum disagreement detector 460 can be implemented using software, hardware, or a combination of both.

Exemplary Computing Environment

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 583 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for commutativity detection in the generalized Paxos algorithm, the method comprising:
   receiving a vote for a command from one of a plurality of acceptors at a learner, wherein the learner is associated with a state machine, the command is executable by the state machine, and the vote is associated with a ballot;
   determining if the ballot associated with the vote is newer than a current ballot, and replacing the current ballot with the ballot associated with the vote if it is determined that the ballot associated with the vote is newer than the current ballot;
   determining if the voted for command commutes with a set of previously voted for commands from the acceptor for the current ballot by executing the voted for command in a transactional substrate associated with the state machine, determining a transactional state resulting from the execution of the voted for command in the transactional substrate, and storing the voted for command and the resulting transactional state in a transactions table, and if the voted for command commutes with the set of previously voted for commands from the acceptor for the current ballot, adding the voted for command to the set of previously voted for commands from the acceptor, and, if the voted for command does not commute with the set of previously voted for commands from the acceptor for the current ballot, then appending a sentinel value to the set of previously voted for commands from the acceptor for the current ballot, wherein the stored transactional state comprises a record of objects read before execution of the voted for command in the transactional substrate, a record of objects written and corresponding written values, and a record of a response sent to a client from which the voted for command originated;
   determining if a quorum of acceptors has voted for an equivalent set of commands from the set of previously voted for commands;
   committing the state machine to each command from the equivalent set of commands if it is determined that a quorum of acceptors has voted for an equivalent set of commands;
   if it is determined that a quorum of acceptors has not voted for a set of equivalent commands:
      determining if there is a quorum disagreement; and
      notifying a proposer to begin a new ballot if it is determined that there is a quorum disagreement.

2. The method of claim 1, wherein determining if the voted for command commutes with a set of previously voted for commands from the acceptor for the current ballot by executing the voted for command in a transactional substrate associated with the state machine comprises:
   determining if the transactional state resulting from the execution of the voted for command conflicts with any transactional states resulting from the execution of the commands from the set of previously voted for commands; and
   determining that the voted for command commutes with commands from the set of previously voted for commands if the transactional state resulting from the execution of the voted for command does not conflict with any of the transactional states resulting from the execution of each of the commands from the set of previously voted for commands.

3. The method of claim 2, wherein each transactional state comprises the objects written to and read from during the execution of the associated command in the transactional substrate, and determining if the transactional state associated with the execution of the voted for command conflicts with any transactional states resulting from the execution of the commands from the set of previously voted for commands comprises:
   determining that there is a conflict if any of the objects written to in the transactional state associated with the execution of the voted for command are the same as any of the objects read from in any of the transactional states resulting from the execution of the commands from the set of previously voted for commands; and
   determining that there is a conflict if any of the objects read from in the transactional state associated with the execution of the voted for command are the same as any of the objects written to in any of the transactional states resulting from the execution of the commands from the set of previously voted for commands.

4. The method of claim 3, wherein committing the state machine to each command from the equivalent set of commands if it is determined that a quorum of acceptors has voted for an equivalent set of commands comprises committing the state machine to the transactional state associated with each command from the equivalent set of commands.

5. The method of claim 1, wherein determining that there is quorum disagreement comprises:
determining if there is a set of acceptors comprising an acceptable quorum configuration, wherein no acceptor in the set has voted for a command that does not commute with the commands voted for by any other acceptor in the set; and
determining that there is a quorum disagreement if there is no set of acceptors comprising an acceptable quorum configuration, wherein no acceptor in the set has voted for a command that does not commute with the commands voted for by any other acceptor in the set.

6. A computer-readable storage medium that is not a signal with computer-executable instructions stored thereon for performing a method comprising:
receiving a vote for a command from one of a plurality of acceptors at a learner, wherein the learner is associated with a state machine, the command is executable by the state machine, and the vote is associated with a ballot;
determining if the ballot associated with the vote is newer than a current ballot, and replacing the current ballot with the ballot associated with the vote if it is determined that the ballot associated with the vote is newer than the current ballot;
determining if the voted for command commutes with a set of previously voted for commands from the acceptor for the current ballot by executing the voted for command in a transactional substrate associated with the state machine, determining a transactional state resulting from the execution of the voted for command in the transactional substrate, and storing the voted for command and the resulting transactional state in a transactions table, and if the voted for command commutes with the set of previously voted for commands from the acceptor for the current ballot, adding the voted for command to the set of previously voted for commands from the acceptor, and, if the voted for command does not commute with the set of previously voted for commands from the acceptor for the current ballot, then appending a sentinel value to the set of previously voted for commands from the acceptor for the current ballot, wherein the stored transactional state comprises a record of objects read before execution of the voted for command in the transactional substrate, a record of objects written and corresponding written values, and a record of a response sent to a client from which the voted for command originated;
determining if a quorum of acceptors has voted for an equivalent set of commands from the set of previously voted for commands;
committing the state machine to each command from the equivalent set of commands if it is determined that a quorum of acceptors has voted for an equivalent set of commands;
if it is determined that a quorum of acceptors has not voted for a set of equivalent commands:
determining if there is a quorum disagreement; and
notifying a proposer to begin a new ballot if it is determined that there is a quorum disagreement.

7. The computer-readable storage medium of claim 6, wherein determining if the voted for command commutes with a set of previously voted for commands from the acceptor for the current ballot by executing the voted for command in a transactional substrate associated with the state machine comprises computer-executable instructions for:
determining if the transactional state resulting from the execution of the voted for command conflicts with any transactional states resulting from the execution of the commands from the set of previously voted for commands; and
determining that the voted for command commutes with commands from the set of previously voted for commands if the transactional state resulting from the execution of the voted for command does not conflict with any of the transactional states resulting from the execution of each of the commands from the set of previously voted for commands.

8. The computer-readable storage medium of claim 7, wherein each transactional state comprises the objects written to and read from during the execution of the associated command in the transactional substrate, and determining if the transactional state associated with the execution of the voted for command conflicts with any transactional states resulting from the execution of the commands from the set of previously voted for commands comprises computer-executable instructions for:
determining that there is a conflict if any of the objects written to in the transactional state associated with the execution of the voted for command are the same as any of the objects read from in any of the transactional states resulting from the execution of the commands from the set of previously voted for commands; and
determining that there is a conflict if any of the objects read from in the transactional state associated with the execution of the voted for command are the same as any of the objects written to in any of the transactional states resulting from the execution of the commands from the set of previously voted for commands.

9. The computer-readable storage medium of claim 8, wherein committing the state machine to each command from the equivalent set of commands if it is determined that a quorum of acceptors has voted for an equivalent set of commands comprises computer-executable instructions for committing the state machine to the transactional state associated with each command from the equivalent set of commands.

10. The computer-readable storage medium of claim 6, wherein determining that there is quorum disagreement comprises computer-executable instructions for:
determining if there is a set of acceptors comprising an acceptable quorum configuration, wherein no acceptor in the set has voted for a command that does not commute with the commands voted for by any other acceptor in the set; and
determining that there is a quorum disagreement if there is no set of acceptors comprising an acceptable quorum configuration, wherein no acceptor in the set has voted for a command that does not commute with the commands voted for by any other acceptor in the set.

11. A learner comprising:
a memory storing a transactions table;
a processor;
a receiver executing in the processor and configured to receive a vote for a command from one of a plurality of acceptors, wherein the vote is associated with a ballot;
a ballot updater executing in the processor and configured to determine if the ballot associated with the vote is newer than a current ballot, and to replace the current ballot with the ballot associated with the vote if it is determined that the ballot associated with the vote is newer than the current ballot;

a commutativity detector executing in the processor and configured to determine if the voted for command commutes with a set of previously voted for commands from the acceptor for the current ballot, the commutativity detector comprising an executor executing in the processor and comprising a transactional substrate in a state machine, the commutativity detector configured to execute the voted for command in the transactional substrate without committing the state machine to a result of executing the voted for command and to determine a transactional state resulting from the execution of the voted for command in the transactional substrate and to store the voted for command and the resulting transactional state in the transactions table, the commutativity detector further comprising a conflict detector executing in the processor and configured to determine whether any two commands in the set of previously voted for commands perform read and write operations to a same location in the memory, the commutativity detector being further configured to add the voted for command to the set of previously voted for commands from the acceptor if the voted for command commutes with a set of previously voted for commands from the acceptor for the current ballot and, if the voted for command does not commute with the set of previously voted for commands from the acceptor for the current ballot, to append a sentinel value to the set of previously voted for commands from the acceptor for the current ballot and to add the voted for command to a buffer associated with the acceptor for the current ballot, wherein the stored transactional state comprises a record of objects read before execution of the voted for command in the transactional substrate, a record of objects written and corresponding written values, and a record of a response sent to a client from which the voted for command originated;

a quorum detector executing in the processor and configured to determine whether a quorum of the plurality of acceptors have voted for an equivalent set of commands from the set of previously voted for commands;

a committer executing in the processor and configured to commit the state machine if it is determined that a quorum of acceptors have voted for an equivalent set of commands; and a quorum disagreement detector executing in the processor and configured to determine if there is a quorum disagreement and to:
  notify a proposer to begin a new ballot if it is determined that there is a quorum disagreement;
  if it is determined that a quorum of acceptors has not voted for a set of equivalent commands:
    determining if there is a quorum disagreement; and
    notifying a proposer to begin a new ballot if it is determined that there is a quorum disagreement.

12. The learner of claim 11, wherein the commutativity detector is configured to:
  determine if the transactional state resulting from the execution of the voted for command conflicts with any transactional states resulting from the execution of the commands from the set of previously voted for commands; and
  determine that the voted for command commutes with commands from the set of previously voted for commands if the transactional state resulting from the execution of the voted for command does not conflict with any of the transactional states resulting from the execution of each of the commands from the set of previously voted for commands.

13. The learner of claim 12, wherein the committer is adapted to commit the state machine to each command from the equivalent set of commands by committing the state machine to the transactional state associated with each of the commands in the equivalent set of commands.

14. The learner of claim 11, wherein the quorum disagreement detector is configured to determine if there is a quorum disagreement by determining whether a number of the plurality of acceptors that have voted for conflicting sets of commands is such that it is not possible to achieve a quorum of the plurality of acceptors voting for an equivalent set of commands.

* * * * *